United States Patent Office 3,720,492
Patented Mar. 13, 1973

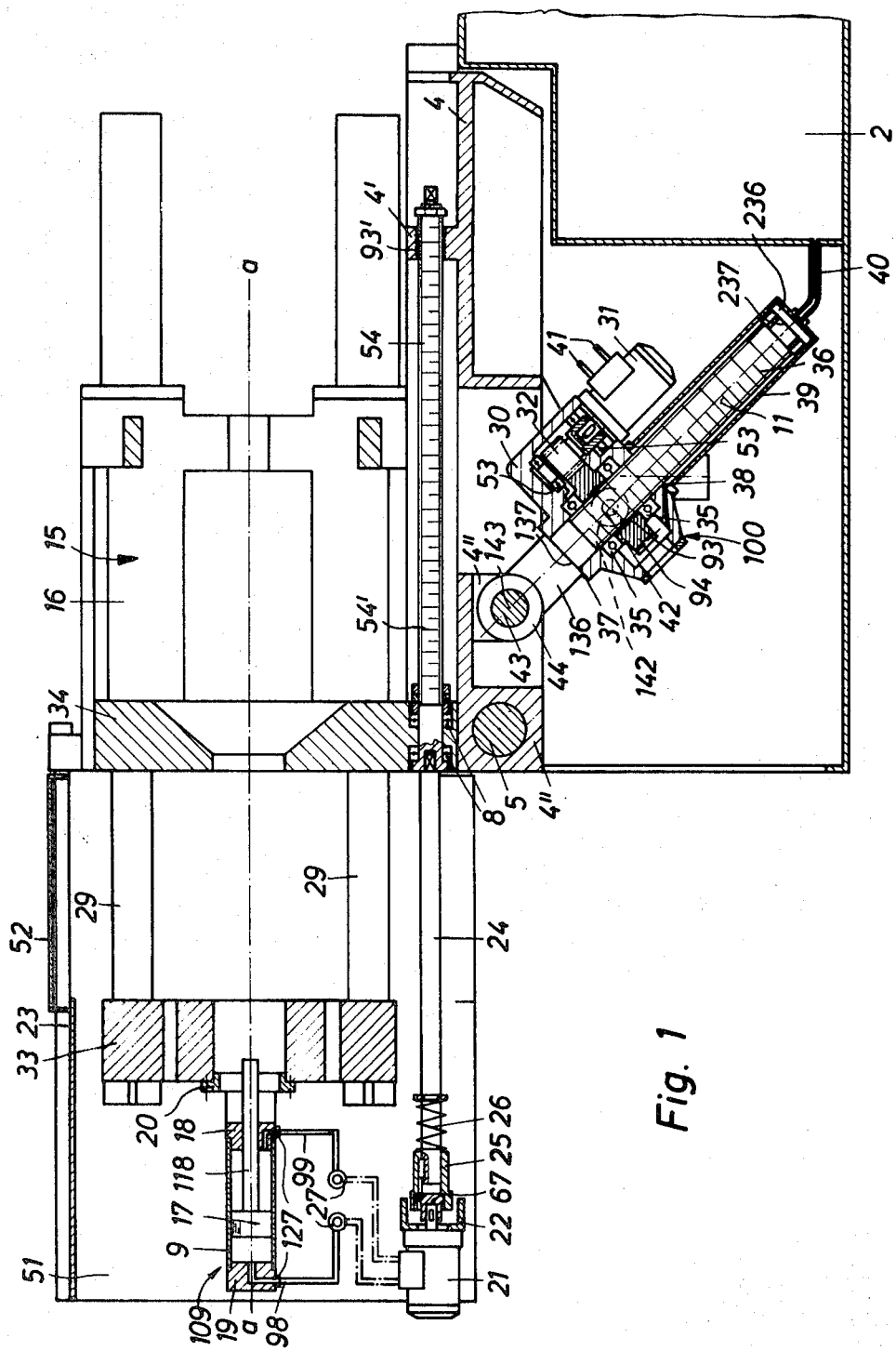

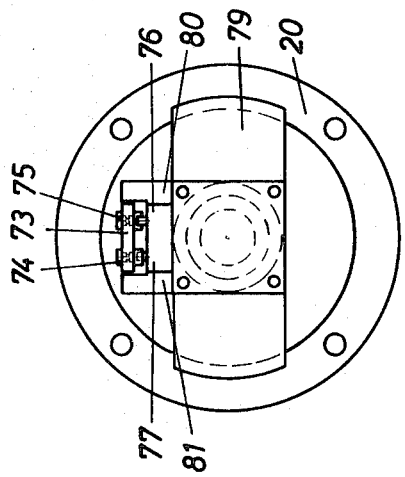
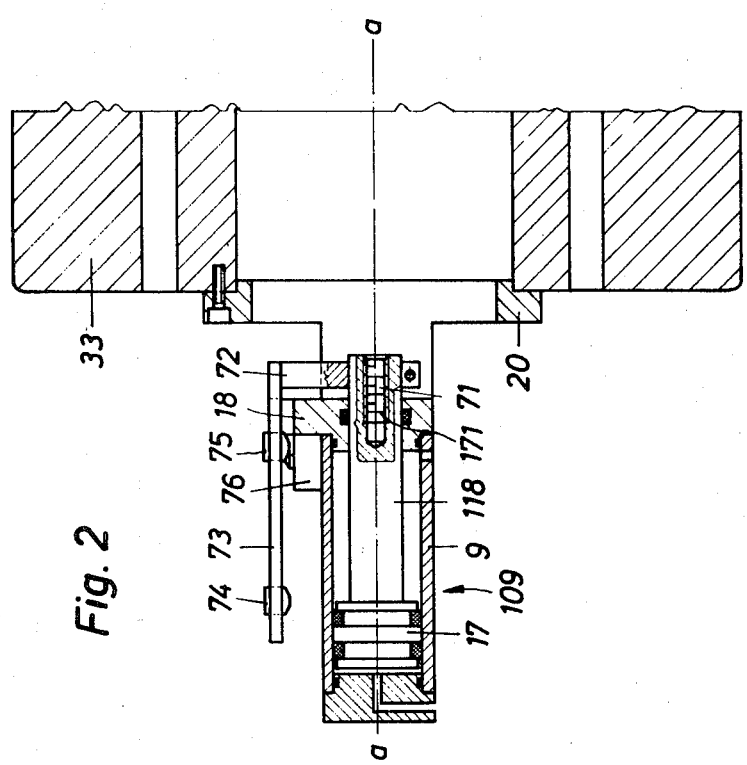

3,720,492
MACHINE FOR PROCESSING SYNTHETIC
MATERIALS
Karl Hehl, 183 Siedlung, Lossburg,
Wurttemberg, Germany
Filed Apr. 6, 1971, Ser. No. 131,666
Claims priority, application Germany, Apr. 25, 1970,
P 20 20 336.5
Int. Cl. B28b 17/00
U.S. Cl. 425—107                                10 Claims

ABSTRACT OF THE DISCLOSURE

An injection molding apparatus having a base and injection mold clamping means which is displaceable in its axial direction as well as pivotal by at least 90° with respect to the base by means of a motor-driven turning assembly having a screw and nut drive. The mold clamping means is moved axially by means of a motor-driven screw and nut drive.

CROSS-REFERENCE TO RELATED APPLICATIONS

This application is related to U.S. application Ser. No. 131,665, filed Apr. 6, 1971 by Karl Hehl.

BACKGROUND OF THE INVENTION

The present invention relates to the invention covered by U.S. Pat. No. 3,564,658, issued Feb. 23, 1971 to Karl Hehl.

The lifting device of the machine set out in the above-mentioned patent uses a hydraulic piston and cylinder. With such a device, the pivoting speed of the clamping unit depends on the counterpressure which is applied to the hydraulic piston and cylinder, that is, it depends on the weight of the mold clamping unit. Since the weight of the mold clamping unit is a variable parameter, different pivoting speeds result.

SUMMARY OF THE INVENTION

It is among the objects of the present invention to provide an injection molding machine of the type disclosed in the above-mentioned U.S. Pat. No. 3,564,658 which overcomes the problem referred to above and which provides an improved arrangement for axially displacing the mold clamping unit. It is a further object of the present invention to economically provide very heavy machines that can be set to the required operating positions without significant expenditures of time and effort.

These objects and others are accomplished, according to the present invention, in that the lifting device is designed as a motor-driven turning assembly having a screw. This arrangement produces an accurate and positive pivoting of the clamping unit at constant pivoting speeds.

Advisably, the screw is joined to the cast piece at a predetermined distance from the pivoting axis of the clamping unit and is in engagement with the internal threading of a gear to form a screw and nut drive. The gear is held by axially stationary, thrust bearings and driven via a pinion by a fluid motor.

A screw of a device for axially displacing the clamping unit can be driven by a fluid motor whose fluid supply and discharge lines can be selectively connected by means of for example, quick-disconnect couplings to the cylinder chambers of a fluid ejector cylinder.

Such an arrangement achieves a substantial saving in, for example, hydraulic lines, and thus, in the weight of the machine.

BRIEF DESCRIPTION OF THE DRAWINGS

FIG. 1 is a partly schematic, side elevational, cross-sectional view of a machine, according to the present invention.

FIG. 2 is a detail of FIG. 1 showing an ejector device.
FIG. 3 is a front elevation view of the ejector device according to FIG. 2 drawn to an enlarged scale.

DESCRIPTION OF THE PREFERRED EMBODIMENTS

Figure 4:
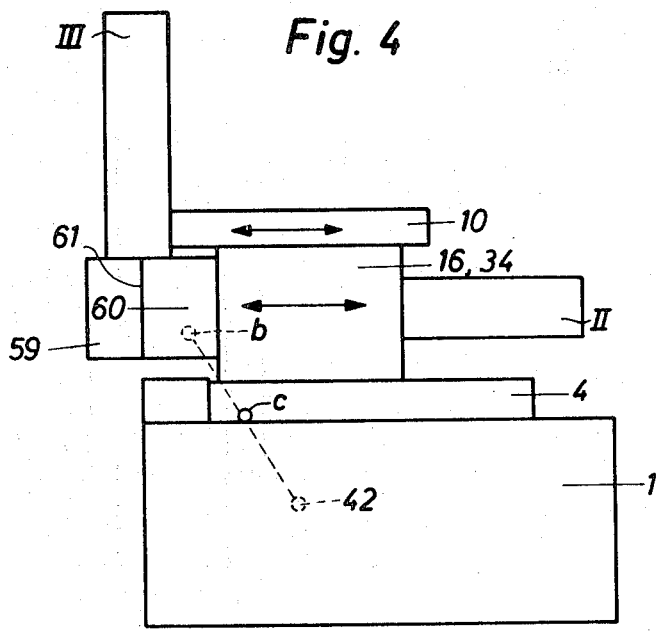
FIGS. 4 and 5 are schematic illustrations of the machine according to FIG. 1 shown in different operating positions to explain the kinematics thereof.
Figure 5:
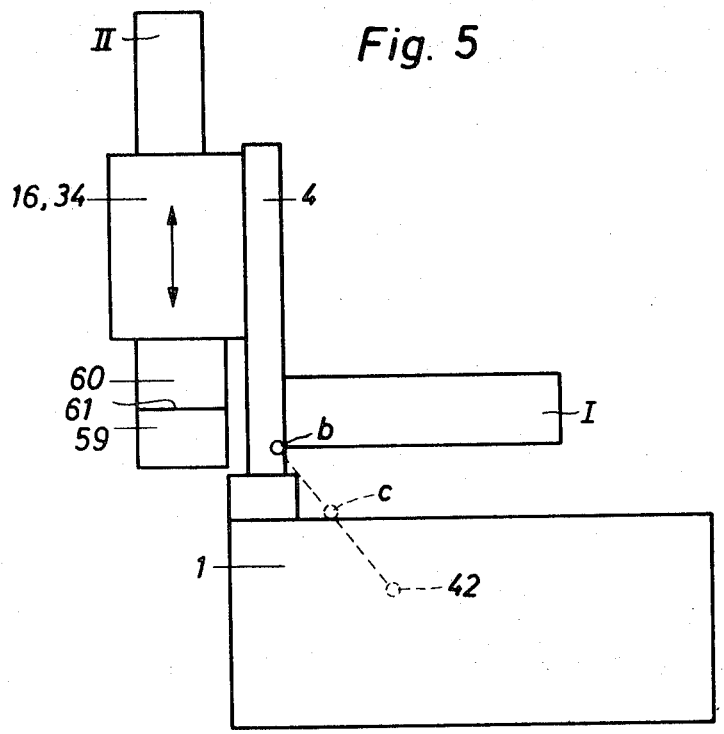

A clamping member 16, 34 for mold halves 59, 60 is axially displaceably mounted on a cast strut 4. An injection unit designated II in FIG. 4, which operates transversally to the separating groove 61 of the mold is held by the clamping 59, 60 member 16, 34. The cast strut 4 which serves to form part of a slide bearing, is pivotally connected with a supporting machine, or apparatus base 1 by a suitable axle 5. After the clamping member 16, 34 is pivoted into the vertical position shown in FIG. 5, a further injection unit designated I, can be connected to the cast strut 4 so as to operate into the separating groove 61 of mold 59, 60. A device, or carriage 10 is displaceably mounted on the axially extended clamping member 16, 34, which carriage 10 holds yet another injection unit, designated III, which may also operate into separating groove 61. By axially displacing the clamping member 16, 34, the separating groove 61 can be accurately aligned with the injection axis (not shown) of injection unit I, as can be seen in FIG. 5. Injection unit III can be aligned with the separating groove 61 by adjusting the carriage 10.

A stationary clamping plate 34 is attached to a block 16 to form a substantially cube-shaped block defining clamping member 16, 34. Bores (not shown) are formed in block 16. Pistons (not shown) are arranged in the bores. A moveable clamping plate 33 is disposed at the free ends of piston rods 29 connected to these pistons to form a clamping unit 15.

Clamping member 16, 34 thus simultaneously act as a support for a mold half and as a fluid system which is able to produce the closing force for the mold 59, 60.

The part of the apparatus set out above is disclosed in more detail in U.S. Pat. No. 3,564,658, issued Feb. 23, 1971 to Karl Hehl.

The lifting, or pivoting device, according to the present invention, will now be described. A turning assembly 100 having a screw 36 with screw threads 11 is pivotally attached to struts 4 at a predetermined distance from a pivot axis 5. The threads 11 of screw 36 are arranged in threaded engagement with internal screw threads 93 formed in the wall of the shaft receiving hole of a gear 94. Gear 94, which forms a screw-and-nut drive with screw 36, is held by, for example, suitable known axially stationary, thrust bearings 35, and is driven by, for example, a fluid motor 31, via a pinion 32. Motor 31 may be, for example, a suitable known hydraulic motor.

The elements 32, 35, 36, 53, and 94 are disposed in, for example, a lubricant bath in a housing 30, 39. Any suitable, known lubricant, such as an oil, may be used. Housing 30, 39 is preferably filled with a lubricant and is in communication with a lubricant supply tank 2 via a suitable, known flexible and extensible line 40. Housing section 30, which accommodates the thrust bearings 35, is mounted in supporting base 1 by suitable, known bearings 142 for pivotal movement about an axis 42. Axis 42 is disposed in the projection of the connecting line between those points b and c which are defined by the junction point 143 at the horizontal and vertical positions of the struts 4 (FIGS. 4 and 5, respectively). Screw 36 is pivotally connected to a shaft 43 by means of a bearing 44. Shaft 43 is attached to struts 4 by, for example, projections 4'''.

The line 40 is able to follow the movement of the lower end of the turning assembly 100 in the course of raising and lowering the clamping unit 15.

Screw 36 has an upper section 136 and a lower section 236, having a larger diameter than the middle section of screw 36. At the junction of sections 136, 236 with the middle section of the screw 36 annular shoulders 137, 237, respectively, are formed. Annular shoulders 137, 237 limit the axial movement of screw 36. In the position shown in FIG. 1 of the drawings, the upper annular shoulder 137 is butting against a shoulder 37 formed in housing section 30. When the apparatus has taken up a position according to FIG. 5 of the drawings, the lower annular shoulder 237 contacts a shoulder 38 also formed in housing section 30. Screw 36 is preferably dimensioned to pivot the clamping unit 15 through an angle of at least 90°. A shield tube 39 connected to housing section 30 in a known manner forms a section of the assembly housing 30, 39. The drive shaft of the motor 31, which is provided with known fluid connections 41, drives pinion 32 which is held in housing section 30 by suitable, known bearings 53 and which meshes with the teeth of gear 94.

The clamping member 16, 34 of the machine is mounted on struts 4 to be displaceable along axis a—a by means of a screw, or screws, 54 provided with screw threads 54'. Screw 54 is driven by a fluid, preferably hydraulic motor 21 which is fastened to a traversely extending structural member 22. Member 22 engages a stationary protective hood 51, which itself is fastened to clamping member 16, 34. Protective hood 51 has a U-shaped cross-section and covers clamping unit 15 at the top and on both sides (as shown in FIG. 1). A detailed example of such a hood may be found in, for example, U.S. application ser. No. 131,665, filed Apr. 6, 1971 by Karl Hehl. A shaft 24 has opposed ends, one of which ends is rigidly connected in a known manner to screw 54 so as to be rotatable therewith. A covering sleeve 25 is keyed in a known manner to the drive shaft 62 of motor 21. The other end of shaft 24 is keyed in a known manner in sleeve 25 and is arranged for movement in a telescoping manner with respect to sleeve 25. A suitable, known spring 26 is arranged on shaft 24 and biases sleeve 25 and shaft 24 away from one another. Sleeve 25 can be decoupled from shaft 62 by hand. Screw 54 is in threaded engagement with internal threading 93' formed in a bore defined in a projection 4' of strut 4. Clamping member 16, 34 is connected with screw 54 via suitable, known axial thrust bearings 8 so that it is carried along when the screw 54 is axially displaced by rotating in projection 4'. The axial play necessary for screw 54 is supplied by the telescoping connection of shaft 24 to motor 21. This axial play is necessary because of the large masses being moved by screw 54.

From connections 27 of the known fluid pressure system (not shown) of the machine, fluid lines 98, 99 lead to the pressure chambers of a fluid ejection piston and cylinder assembly 109. Cylinder 9 of this assembly 109 is provided with cylinder covers 18, 19. Cover 18 is connected with a mounting ring 20 and serves as a fastening member for indirectly fastening cylinder 9 to movable clamping plate 33. The piston rod 118 of a piston 17 of injection cylinder 9—which piston rod 118 serves as the ejector—is disposed coaxially to axis a—a of clamping unit 15. Axis a—a also serves as the injection axis of injection cylinder II (FIGS. 1 and 4). Fluid lines 98, 99 are connected to the pressure chambers of the injection cylinder 9 by means of, for example, quick-disconnect couplings 127. Lines 98, 99 can be selectively coupled and decoupled with the aid of these couplings 127 to the fluid intake-discharge connections of ejection cylinder 9 and fluid motor 21. Couplings 127 may be of any suitable, known type.

A displaceable projecting hood 52 is slidably mounted on a pair of guide struts 23 (only one of which is shown in FIG. 1), which are indirectly connected to the supporting base 1 via clamping plate 34. As can be seen from FIGS. 2 and 3 of the drawings, piston rod 118 of piston 17 of injection cylinder 9 is provided with a coaxial bore 71 having internal screw threading 171. The mold ejector (not shown) can be screwed into this internal threading 171. A transversely extending structural member 72 (FIG. 2) is releasably clamped in a known manner to piston rod 118. Member 72 releasably bears a switching bar 73 on which a pair of switching cams 74, 75 are fastened in a known manner so as to be axially adjustable. These switching cams 74, 75 cooperate with a pair of suitable, known microswitches 76, 77 (FIG. 3). Switching cams 74, 75 may be arranged for determining the length of the forward and return strokes of piston rod 118.

When the switching cam 74 runs up on the operating element of the microswitch 76 the electromagnetic valve, controlling the feeding of the pressure chamber of the cylinder is actuated and the feeding is stopped. The fore stroke of the piston is finished. The back stroke is stopped in the analogue way, when cam 75 runs upon the operating element of the microswitch 76.

Guide elements 80 and 81 are provided to assure that the path of movement of switching bar 73, and, thus, the path of movement of switching cams 74 and 75, remains in the path of the associated switching members of microswitches 76, 77. Ejector cylinder 9 is mounted in a known manner on a bridge 79, which is in turn mounted on plate 33 by means of mounting ring 20.

The arrangement of the ejector piston and cylinder assembly 109 makes it possible for the injection stroke of piston rod 118 to be adaptable to the differing requirements of various molds by an appropriate, predetermined setting of switching cams 74, 75.

It will be understood that the above description of the present invention is susceptible to various modifications, changes and adaptations, and the same are intended to be comprehended within the meaning and range of equivalents of the appended claims.

What is claimed is:

1. In an apparatus for processing synthetic materials and having in combination:
   (a) a supporting base;
   (b) means defining an axis for clamping together parts of an injection mold, said clamping means being pivotal through an angle of at least 90° and displaceable in its axial direction;
   (c) means defining a pivot axis spaced from and perpendicular to the axis of said clamping means for pivotally connecting said clamping means to said base, and means for facilitating the axial displacement thereof;
   (d) at least one means arranged coaxial with the axis of said clamping means for injecting material into such mold and fastened to said clamping means;
   (e) at least one means fastened to said pivotally connected means and said axial displacement means for connecting an additional injecting means thereto at right angles to said first mentioned injecting means;
   (f) said pivotally connecting means and said axial displacement facilitating means further defined by having at least one longitudinally extending strut on which the clamping means is disposed for longitudinal movement therealong, and said strut being pivotally connected to said supporting base, thereby to pivotally connect the clamping means thereto; and
   (g) means for pivoting said clamping means through an angle of at least 90°;

the improvement wherein said means for pivoting is a motor-driven turning assembly having a screw with screw threads.

2. An apparatus as defined in claim 1, wherein said turning assembly has a gear, defining a shaft receiving hole with a wall, screw threads formed in said wall, and axially stationary thrust bearings, said gear held by said thrust bearings, and wherein said screw is pivotally connected to said strut and spaced from said pivot axis a predetermined distance, and wherein the screw threads of said screw are arranged in threaded engagement with the screw threads of said gear.

3. An apparatus as defined in claim 2, wherein said turning assembly has a housing enclosing said thrust bearings and said gear, and filled with a lubricant, and further including a lubricant supply tank arranged in said supporting base and a line connecting said lubricant supply tank to said housing.

4. An apparatus as defined in claim 3, further including means for mounting said housing in said supporting base for pivotal movement about an axis disposed in the projection of the connecting line between points which are defined by the junction point of said pivotal connection of said screw to said strut at horizontal and vertical positions of said strut.

5. Apparatus for processing synthetic materials and having in combination:
  (a) a supporting base;
  (b) means defining an axis for clamping together parts of an injection mold, said clamping means being pivotal through an angle of at least 90° and displaceable in its axial direction;
  (c) means defining a pivot axis spaced from and perpendicular to the axis of said clamping means for pivotally connecting said clamping means to said base, and means for having a screw with screw threads and a fluid motor connected to said screw for rotating same for facilitating the axial displacement thereof;
  (d) at least one means arranged coaxial with the axis of said clamping means for injecting material into such mold and fastened to said clamping means;
  (e) at least one fastened to said pivotally connected means and said axial displacement means for connecting an additional injecting means thereto at right angles to said first mentioned injecting means;
  (f) said pivotally connecting means and said axial displacement facilitating means further defined by having at least one longitudinally extending strut on which the clamping means is disposed for longitudinal movement therealong, and said strut being pivotally connected to said supporting base, thereby to pivotally connect the clamping means thereto;
  (g) a fluid ejection piston and cylinder assembly defining pressure chambers and mounted on said clamping means; and
  (h) fluid lines having quick-disconnect coupling for being selectively connected to said pressure chambers and said motor.

6. An apparatus as defined in claim 5, further including means for connecting said screw to said motor in a telescoping manner.

7. An apparatus as defined in claim 6, wherein the telescoping connection means has a sleeve mounted on said motor for rotation therewith, a shaft having opposed ends, one of which ends is rigidly connected to said screw and the other of which ends is arranged in said sleeve for rotation therewith, and a spring arranged on said shaft to bias said sleeve.

8. An apparatus as defined in claim 5, wherein said piston and cylinder assembly has a piston rod, and further including a switching bar releasably fastened on said piston rod.

9. An apparatus as defined in claim 8, further including microswitches mounted on a cylinder of said piston and cylinder assembly, and switching cams mounted on said switching bar and arranged for determining the length of a stroke of said piston.

10. An apparatus as defined in claim 9, further including means for pivoting said clamping means through an angle of at least 90° and having a motor-drive nturning assembly with a screw-and-nut drive connected to said supporting base and said clamping means.

References Cited

FOREIGN PATENTS

| 1,128,126 | 4/1962 | Germany | 425—242 |
| 1,136,099 | 9/1962 | Germany | 425—242 |

H. A. KILBY, JR., Primary Examiner

U.S. Cl. X.R.

425—188, 242